United States Patent
Upadhya et al.

(10) Patent No.: US 12,538,105 B2
(45) Date of Patent: Jan. 27, 2026

(54) DATA COLLECTION OPTIMIZATION

(71) Applicant: Nokia Solutions and Networks Oy, Espoo (FI)

(72) Inventors: Karthik Upadhya, Espoo (FI); Akshay Jain, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/811,204

(22) Filed: Aug. 21, 2024

(65) Prior Publication Data

US 2025/0071526 A1    Feb. 27, 2025

(30) Foreign Application Priority Data

Aug. 24, 2023 (FI) ................................. 20235941

(51) Int. Cl.
*H04W 4/38* (2018.01)
*H04W 52/02* (2009.01)

(52) U.S. Cl.
CPC .......... *H04W 4/38* (2018.02); *H04W 52/0277* (2013.01)

(58) Field of Classification Search
CPC ... H04W 4/38; H04W 52/0277; H04W 4/023; H04W 52/02; H04W 4/021; H04W 4/44; H04W 4/70; H04Q 9/00; H04Q 2209/50; H04Q 2209/88; B64U 2201/00; B64U 2101/20; G06Q 10/063; G06Q 10/08; G06Q 10/047; G06Q 30/018; G06Q 50/04;

(Continued)

(56) References Cited

U.S. PATENT DOCUMENTS 5,850,617 A * 12/1998 Libby ................. B64G 1/244
                                                701/25
2013/0235758 A1* 9/2013 Delmas ............... H04B 7/2606
                                                370/254

(Continued)

FOREIGN PATENT DOCUMENTS

WO    2021/194569 A2    9/2021

OTHER PUBLICATIONS

PCT Application No. PCT/EP2023/055998, "Reconstructing Information Lost in Transferring Data Over a Block Error—Introducing Radio Channel, and Related Devices, Methods and Computer Programs", filed on Mar. 9, 2023, pp. 1-23.

(Continued)

*Primary Examiner* — Michael Y Mapa
(74) *Attorney, Agent, or Firm* — SQUIRE PATTON BOGGS (US) LLP

(57) ABSTRACT

There are provided measures for data collection optimization. Such measures exemplarily comprise selecting, out of a plurality of radio equipment entities, a set of radio equipment entities, based on correlation information reflecting at least temporal and/or spatial correlation among data from said plurality of radio equipment entities, and determining a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities.

9 Claims, 18 Drawing Sheets

(58) Field of Classification Search
CPC ............... G06Q 50/50; G01C 21/206; G05B 2219/31282; G05B 19/4183; G06N 3/02; G06N 20/00
USPC ..................... 370/329; 455/418–420, 431
See application file for complete search history.

(56) References Cited

U.S. PATENT DOCUMENTS

| | | | | |
|---|---|---|---|---|
| 2017/0086054 | A1* | 3/2017 | Azevedo | H04W 4/70 |
| 2020/0252122 | A1* | 8/2020 | Tofighbakhsh | H04B 7/18506 |
| 2020/0354056 | A1* | 11/2020 | Borras | H04L 67/141 |
| 2021/0409912 | A1 | 12/2021 | Byrne | |
| 2023/0239037 | A1* | 7/2023 | Zhang | H04B 7/18508 455/431 |

OTHER PUBLICATIONS

Ajinder, "IoT—Power Challenge—How low can we go? APEC PSMA Packaging Industry Session", Texas Instrument, Retrieved on Aug. 15, 2024, Webpage available at : https://www.ti.com/lit/ml/slyy133/slyy133.pdf?ts=1688547913913.

Lauridsen et al., "An Empirical NB-IoT Power Consumption Model for Battery Lifetime Estimation", IEEE 87th Vehicular Technology Conference (VTC Spring), Jun. 3-6, 2018, 5 pages.

Caillouet et al., "Efficient Data Collection and Tracking with Flying Drones", Ad Hoc Networks, vol. 89, Jun. 1, 2019, pp. 1-14.

Samir et al., "UAV Trajectory Planning for Data Collection from Time-Constrained IoT Devices", IEEE Transactions on Wireless Communications, vol. 19, No. 1, Jan. 2020, pp. 34-46.

Wei et al., "UAV-Assisted Data Collection for Internet of Things: A Survey", IEEE Internet of Things Journal, vol. 9, No. 17, Sep. 1, 2022, pp. 15460-15483.

Zhu et al., "UAV Trajectory Planning in Wireless Sensor Networks for Energy Consumption Minimization by Deep Reinforcement Learning", IEEE Transactions on Vehicular Technology, vol. 70, No. 9, Sep. 2021, pp. 9540-9554.

Office Action received for corresponding Finnish Patent Application No. 20235941, dated Feb. 29, 2024, 10 pages.

Zhang et al., "Learning-Based Energy-Efficient Data Collection by Unmanned Vehicles in Smart Cities", IEEE Transactions on Industrial Informatics, vol. 14, No. 4, Apr. 2018, pp. 1666-1676.

Sun et al., "PRSS: A Prejudiced Random Sensing Strategy for Energy-Efficient Information Collection in the Internet of Things", IEEE Internet of Things Journal, vol. 6, No. 2, Apr. 2019, pp. 2717-2728.

Office Action received for corresponding Finnish Patent Application No. 20235941, dated Jul. 30, 2024, 4 pages.

European Office Action issued in corresponding European Patent Application No. 24194593.0-1206 on Feb. 14, 2025.

Kaddour Messaoudi et al., "A survey of UAV-based data collection: Challenges, solutions and future perspectives", Journal of Network and Computer Applications 216 (2023) 103670, www.elsevier.com/locate/jnca, https://doi.org/10.1016/j.jnca.2023.103670, 44 pages.

* cited by examiner

DATA COLLECTION OPTIMIZATION

RELATED APPLICATION

This application claims priority to Finnish Application No. 20235941, filed on Aug. 24, 2023, which is incorporated herein by reference in its entirety.

FIELD

Various example embodiments relate to data collection optimization. More specifically, various example embodiments exemplarily relate to measures (including methods, apparatuses and computer program products) for realizing data collection optimization.

BACKGROUND

The present specification generally relates to devices and sensors producing data, collection of the data, and transport of the data to data consumers in an efficient manner.

Industrial Internet of Things (IIoT) devices and sensors form an essential component of factory automation in the context of Industry 4.0.

These sensors can measure parameters such as temperature, vibration, lubricant quality, levels of smoke, toxic gases, and chemicals, among others. They can be placed in several places around the factory and are critical for factory operations.

These devices/sensors can be battery operated and the need to operate them for extended periods without having to change the batteries may impose limits on energy consumption. These constraints, in turn, restrict both the transmit power and how often these devices can transmit.

For instance, to reduce cost of sensor deployment and power consumption, these sensors may be equipped with Internet of Things (IoT) devices in Long Term Evolution (LTE), namely Category 0, Category M1, and Category NB1 user equipments (UE) that have reduced radio frequency (RF) and baseband capability. Alternatively, the sensors may be equipped with $3^{rd}$ Generation Partnership Project (3GPP) $5^{th}$ Generation (5G) New Radio (NR) reduced capability (Redcap) UEs.

A significant chunk of power consumption for the connectivity part of an IoT sensor can be attributed to the transmission phase. This phase is dominated by the radiated power and the power consumed by the power amplifier (PA). For example, it was estimated that the power consumption during transmission for a Bluetooth IoT sensor is about 2000 times the power consumption in standby mode. Further, measurements with narrow-band IoT (NB-IoT) devices also arrived at a similar conclusion where the power consumption during transmission is around 4 times that required during reception and orders of higher magnitude than that required for standby.

That is, significant improvement in battery life may be obtained by reducing the transmit power (or transmit frequency).

An approach to reduce power consumption of IoT sensors is to employ drones/autonomous guided vehicles (AGV) to collect data acting as a mobile wireless backhaul. Here, AGVs would travel close to the sensors/UEs and would collect data from the sensors/UEs, thereby enabling the IoT devices to transmit at a lower power and only when the AGV is around.

If the AGV visits all the sensors in a round-robin fashion with the shortest trajectory possible, every sensor would be woken up to retrieve data from them which increases the sensors' energy consumption since each sensor has to both receive and transmit data. Additionally, by having to poll every sensor, the freshness or Age of Information (AoI) also grows (almost) linearly with the number of sensors to be polled.

Hence, the problem arises that faithful and up-to-date information are not available while energy may be wasted both at distributed devices/sensors as well as at a movable data collecting entity.

Hence, there is a need to provide for data collection optimization.

SUMMARY

Various example embodiments aim at addressing at least part of the above issues and/or problems and drawbacks.

Various aspects of example embodiments are set out in the appended claims.

According to an exemplary aspect, there is provided a method comprising selecting, out of a plurality of radio equipment entities, a set of radio equipment entities, based on correlation information reflecting at least temporal and/or spatial correlation among data from said plurality of radio equipment entities, and determining a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities.

According to an exemplary aspect, there is provided a method comprising receiving, from a network entity, data from a set of radio equipment entities out of a plurality of radio equipment entities, and generating correlation information reflecting at least temporal and/or spatial correlation among data from said plurality of radio equipment entities based on said data from said set of radio equipment entities.

According to an exemplary aspect, there is provided a method comprising receiving information on a movement trajectory, said movement trajectory being a path with a minimum length among paths connecting all data read-out zones corresponding to all radio equipment entities of a set of radio equipment entities out of a plurality of radio equipment entities, and moving according to said movement trajectory.

According to an exemplary aspect, there is provided an apparatus comprising selecting circuitry configured to select, out of a plurality of radio equipment entities, a set of radio equipment entities, based on correlation information reflecting at least temporal and/or spatial correlation among data from said plurality of radio equipment entities, and determining circuitry configured to determine a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities.

According to an exemplary aspect, there is provided an apparatus comprising receiving circuitry configured to receive, from a network entity, data from a set of radio equipment entities out of a plurality of radio equipment entities, and generating circuitry configured to generate correlation information reflecting at least temporal and/or spatial correlation among data from said plurality of radio equipment entities based on said data from said set of radio equipment entities.

According to an exemplary aspect, there is provided an apparatus comprising receiving circuitry configured to receive information on a movement trajectory, said movement trajectory being a path with a minimum length among paths connecting all data read-out zones corresponding to all radio equipment entities of a set of radio equipment entities out of a plurality of radio equipment entities, and moving circuitry configured to move according to said movement trajectory.

According to an exemplary aspect, there is provided an apparatus comprising at least one processor, and at least one memory storing instructions that, when executed by the at least one processor, cause the apparatus at least to perform selecting, out of a plurality of radio equipment entities, a set of radio equipment entities, based on correlation information reflecting at least temporal and/or spatial correlation among data from said plurality of radio equipment entities, and determining a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities.

According to an exemplary aspect, there is provided an apparatus comprising at least one processor, and at least one memory storing instructions that, when executed by the at least one processor, cause the apparatus at least to perform receiving, from a network entity, data from a set of radio equipment entities out of a plurality of radio equipment entities, and generating correlation information reflecting at least temporal and/or spatial correlation among data from said plurality of radio equipment entities based on said data from said set of radio equipment entities.

According to an exemplary aspect, there is provided an apparatus comprising at least one processor, and at least one memory storing instructions that, when executed by the at least one processor, cause the apparatus at least to perform receiving information on a movement trajectory, said movement trajectory being a path with a minimum length among paths connecting all data read-out zones corresponding to all radio equipment entities of a set of radio equipment entities out of a plurality of radio equipment entities, and moving according to said movement trajectory.

According to an exemplary aspect, there is provided an system, comprising a first network entity configured to carry out the following steps: selecting, out of a plurality of radio equipment entities, a set of radio equipment entities, based on correlation information reflecting at least temporal and/or spatial correlation among data from said plurality of radio equipment entities, and determining a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities; a second network entity configured to carry out the following steps: receiving, from a network entity, data from a set of radio equipment entities out of a plurality of radio equipment entities, and generating correlation information reflecting at least temporal and/or spatial correlation among data from said plurality of radio equipment entities based on said data from said set of radio equipment entities; and a movable data collection entity configured to carry out the following steps: receiving information on a movement trajectory, said movement trajectory being a path with a minimum length among paths connecting all data read-out zones corresponding to all radio equipment entities of a set of radio equipment entities out of a plurality of radio equipment entities, and moving according to said movement trajectory.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient optimization of data collection by optimizing a data collection path or trajectory to thereby solve at least part of the problems and drawbacks identified in relation to the prior art.

By way of example embodiments, there is provided data collection optimization. More specifically, by way of example embodiments, there are provided measures and mechanisms for realizing data collection optimization.

Thus, improvement is achieved by methods, apparatuses and computer program products enabling/realizing data collection optimization.

BRIEF DESCRIPTION OF THE DRAWINGS

In the following, the present disclosure will be described in greater detail by way of non-limiting examples with reference to the accompanying drawings, in which.

DETAILED DESCRIPTION

Figure 1:
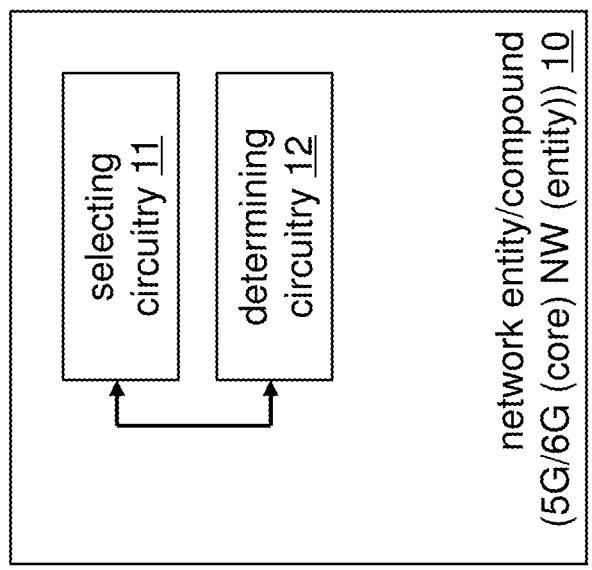
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

According to example embodiments, in general terms, there are provided measures and mechanisms for (enabling/realizing) data collection optimization.

As mentioned above, the problem arises that faithful and up-to-date information are not available while energy may be wasted both at distributed devices/sensors as well as at a movable data collecting entity.

Hence, in brief, according to example embodiments, it is defined which IoT devices or sensors or massive machine-type communications (mMTC) devices and in which order these IoT devices or sensors or mMTC devices are polled by a movable data collecting entity (AGV/drone) to make the IoT devices or sensors or mMTC devices and the movable data collecting entity more energy efficient while maintaining faithful transmission of information.

When in the present specification it is referred to IoT devices or sensors or mMTC devices, each of IoT devices, sensors and mMTC devices and similar is meant/included.

Further, when in the present specification it is referred to drones or AGVs or movable data collecting entities, each of drones, AGVs, and movable data collecting entities and similar is meant/included.

While principles of this disclosure are discussed having an IIoT scenario in mind, example embodiments are not limited to such scenario but may be applicable to any scenario where data accumulates and is to be collected at a plurality of locations.

Example embodiments provide an enhanced movable data collecting entity trajectory optimization that improves the IoT sensor battery life by minimizing the number of times an IoT device is woken up and is queried for data. Furthermore, by reducing the number of sensors to be polled in any given data collection round, it is possible to improve the freshness of information, i.e., AoI.

In particular, in brief, according to example embodiments, autonomously guided vehicle trajectory optimization with next generation cross layer principles is provided.

Example embodiments utilize a next generation cross layer (NGxL) neural network, exploiting inherent temporal and spatial correlation in IoT data. The neural network may be located e.g. on a central cloud or an edge server.

According to example embodiments, the NGxL neural network is executable to utilize temporal and/or spatial correlation information in IoT data. For example, the NN may comprise a convolutional NN, a recurrent NN, a long short-term memory, a multi layer perceptron, a fully connected NN, a transformer NN, a graph NN, and/or a reinforcement learning based NN.

Namely, according to example embodiments, NGxL is utilized to assist with AGV trajectory optimization.

NGxL may enable reconstruction of erroneous data at the application layer by utilizing the temporal and spatial correlation in the underlying data transmitted by the IoT sensors.

According to example embodiments, rather than utilizing the spatial and temporal correlation of the data between sensors to reconstruct erroneous data, the NGxL imputes data for a sensor based on its previous observations and observations from other spatially correlated sensors.

For example, for sensors measuring temperature, temperature may change slowly in time and in space and by learning this pattern, it is often enough to only measure a subset of the sensor data and impute the rest.

Given this framework, according to example embodiments, a network (e.g. 5G/6G network entity/node (compound)—through NGxL—selects sensors based on e.g. AoI and battery levels of the sensors to optimize the AGV trajectory, such that the AGV visits only a subset of the IoT sensors in a single round.

The data from sensors that are not queried are imputed using the NGxL framework by utilizing the spatial and temporal correlation in the data.

The benefits of such an approach are as follows:

Improved battery life: Number of times an IoT sensor is woken up and is made to transmit is reduced. This would improve the overall battery life of the sensors.

Reduction in latency: Since the AGV polls only a subset of sensors, the round-trip time for the set of all sensors is reduced. This reduces latency and improves the "freshness" of the data, i.e., AoI.

Reduction in AGV energy consumption: Since the AGV can adopt a shorter trajectory since it only polls a subset of the sensors, this would enable the AGV to save energy. This would be particularly useful when the AGV is an unmanned aerial vehicle (UAV) and has a limited amount of battery power.

According to example embodiments, a system is provided, wherein an AGV, following a trajectory, acts as a relay between a set of sensors transferring data to the core network.

According to example embodiments, a method for the system is provided, that optimizes the trajectory of sensors based on the spatial and temporal correlation in the sensor data.

According to example embodiments, an explicit path optimization request message is transferred from NGxL to the 5G/6G network.

According to example embodiments, an explicit path update message is transferred from 5G/6G network to the AGV based on the correlation statistics received from NGxL.

Example embodiments are specified below in more detail.

Figure 7:
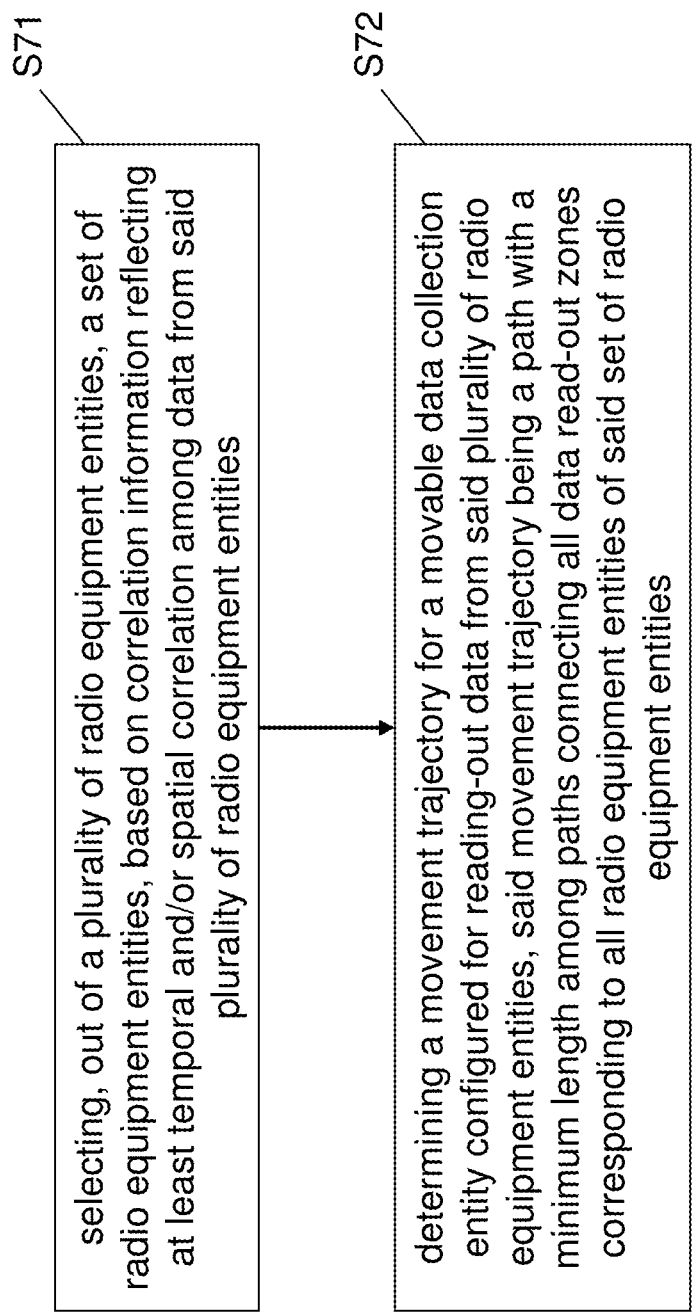
FIG. 7 is a schematic diagram of a procedure according to example embodiments.

FIG. 1 is a block diagram illustrating an apparatus according to example embodiments. The apparatus may be a network node or entity or a compound of network nodes or entities 10 such as a 5G/6G (core) network (node/entity), and comprises a selecting circuitry 11 and a determining circuitry 12. The selecting circuitry 11 selects, out of a plurality of radio equipment entities, a set of radio equipment entities, based on correlation information reflecting at least temporal and/or spatial correlation among data from said plurality of radio equipment entities. The determining circuitry 12 determines a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities. FIG. 7 is a schematic diagram of a procedure according to example embodiments. The apparatus according to FIG. 1 may perform the method of FIG. 7 but is not limited to this method. The method of FIG. 7 may be performed by the apparatus of FIG. 1 but is not limited to being performed by this apparatus.

As shown in FIG. 7, a procedure according to example embodiments comprises an operation of selecting (S71), out of a plurality of radio equipment entities, a set of radio equipment entities, based on correlation information reflecting at least temporal and/or spatial correlation among data from said plurality of radio equipment entities, and an operation of determining (S72) a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities.

Figure 2:
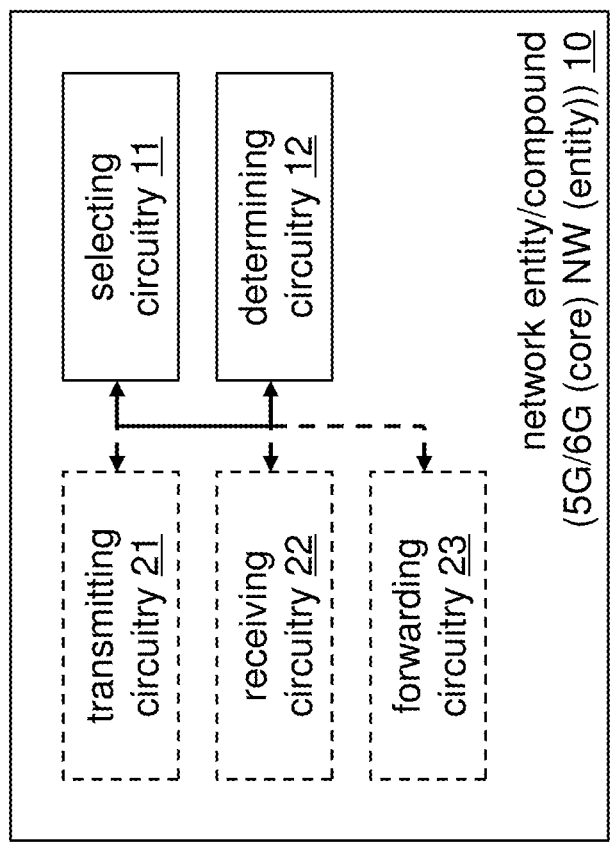
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a transmitting circuitry 21, a receiving circuitry 22, and/or a forwarding circuitry 23.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to further example embodiments, a data readout zone corresponding to a radio equipment entity is defined by a spectral efficiency between said radio equipment entity and said movable data collection entity being equal to or larger than a minimum spectral efficiency.

According to a variation of the procedure shown in FIG. 7, exemplary additional operations are given, which are inherently independent from each other as such. According to such variation, an exemplary method according to example embodiments may comprise an operation of transmitting information on said movement trajectory to said movable data collection entity.

According to a variation of the procedure shown in FIG. 7, exemplary additional operations are given, which are inherently independent from each other as such. According to such variation, an exemplary method according to example embodiments may comprise an operation of transmitting information on said set of radio equipment entities to said movable data collection entity.

According to a variation of the procedure shown in FIG. 7, exemplary additional operations are given, which are inherently independent from each other as such. According to such variation, an exemplary method according to example embodiments may comprise an operation of receiving a path optimization request message including at least said correlation information.

According to further example embodiments, said path optimization request message further includes at least one of the following: energy information indicative of energy availabilities of said plurality of radio equipment entities, or age information indicative of ages of data from said radio equipment entities.

According to further example embodiments, said selecting is further based on said energy information and/or said age information.

According to further example embodiments, each of said radio equipment entities is a sensor entity configured to produce sensor data.

According to a variation of the procedure shown in FIG. 7, exemplary additional operations are given, which are inherently independent from each other as such. According to such variation, an exemplary method according to example embodiments may comprise an operation of receiving, from said movable data collection entity, data from said set of radio equipment entities, and an operation of forwarding said data from said set of radio equipment entities.

Figure 3:
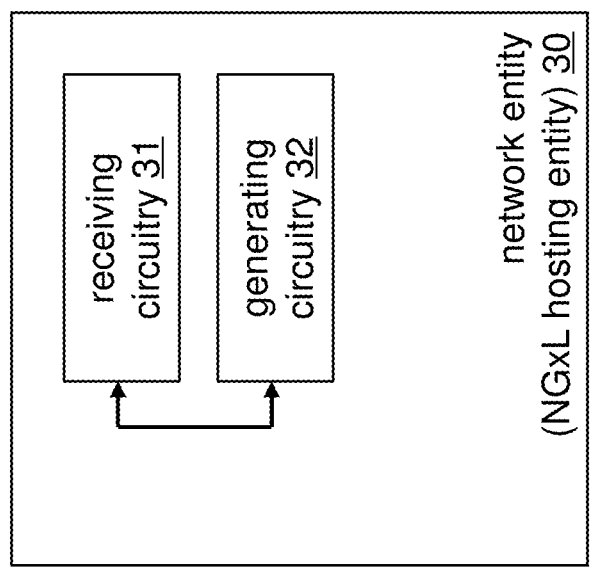
FIG. 3 is a block diagram illustrating an apparatus according to example embodiments.
Figure 8:
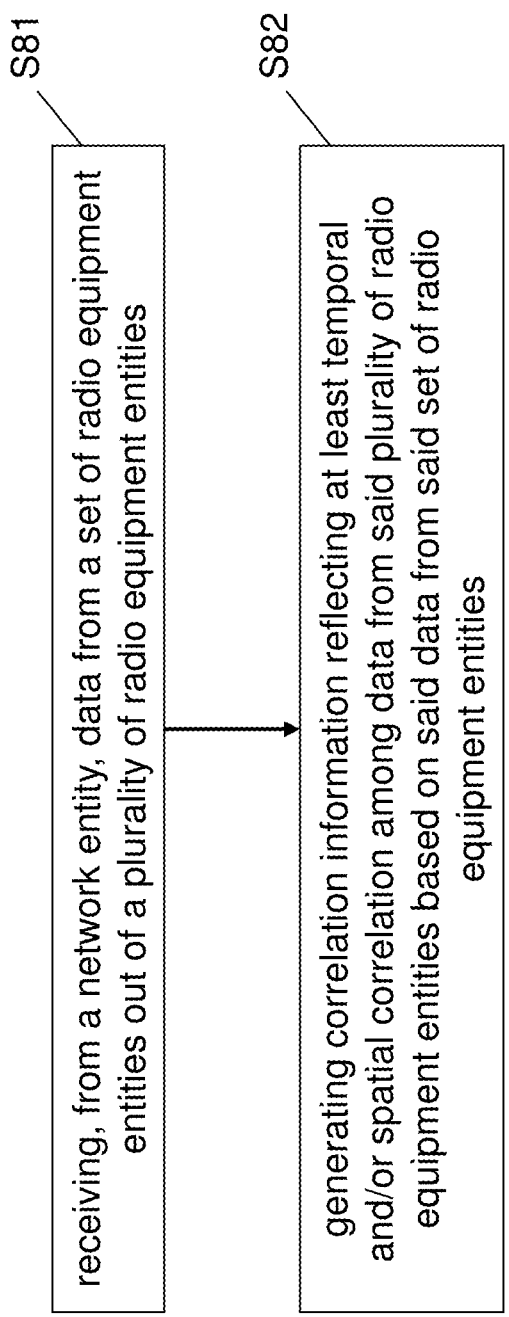
FIG. 8 is a schematic diagram of a procedure according to example embodiments.

FIG. 3 is a block diagram illustrating an apparatus according to example embodiments. The apparatus may be a network node or entity 30 such as a network node or entity (e.g. edge server or centralized data center) hosting a neural network such as a next generation cross layer residing on said e.g. edge server or centralized data center, and comprises a receiving circuitry 31 and a generating circuitry 32. The receiving circuitry 31 receives, from a network entity, data from a set of radio equipment entities out of a plurality of radio equipment entities. The generating circuitry 32 generates correlation information reflecting at least temporal and/or spatial correlation among data from said plurality of radio equipment entities based on said data from said set of radio equipment entities. FIG. 8 is a schematic diagram of a procedure according to example embodiments. The apparatus according to FIG. 3 may perform the method of FIG. 8 but is not limited to this method. The method of FIG. 8 may be performed by the apparatus of FIG. 3 but is not limited to being performed by this apparatus.

As shown in FIG. 8, a procedure according to example embodiments comprises an operation of receiving (S81), from a network entity, data from a set of radio equipment entities out of a plurality of radio equipment entities, and an operation of generating (S82) correlation information reflecting at least temporal and/or spatial correlation among data from said plurality of radio equipment entities based on said data from said set of radio equipment entities.

Figure 4:
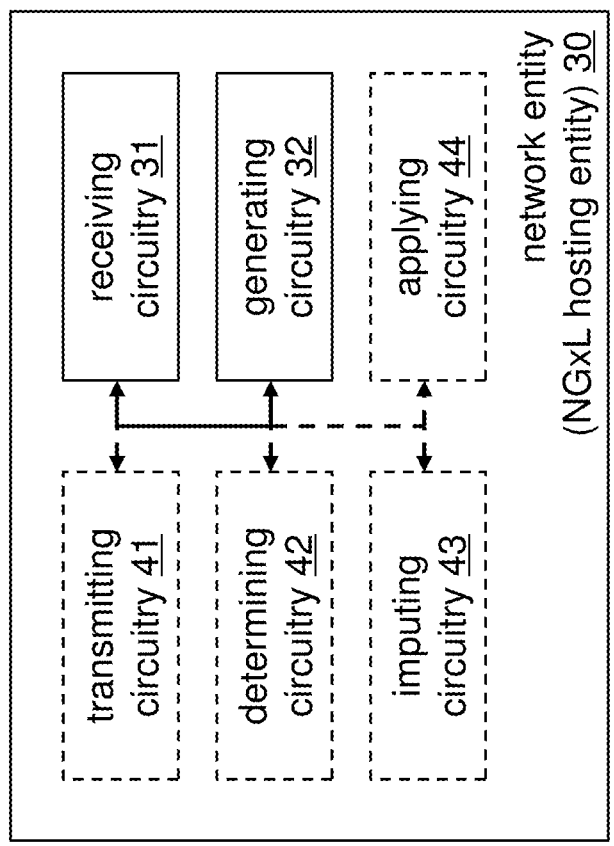
FIG. 4 is a block diagram illustrating an apparatus according to example embodiments.

FIG. 4 is a block diagram illustrating an apparatus according to example embodiments. In particular, FIG. 4 illustrates a variation of the apparatus shown in FIG. 3. The apparatus according to FIG. 4 may thus further comprise a transmitting circuitry 41, a determining circuitry 42, an imputing circuitry 43, and/or an applying circuitry 44.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 8, exemplary additional operations are given, which are inherently independent from each other as such. According to such variation, an exemplary method according to example embodiments may comprise an operation of transmitting a path optimization request message including at least said correlation information.

According to a variation of the procedure shown in FIG. 8, exemplary additional operations are given, which are inherently independent from each other as such. According to such variation, an exemplary method according to example embodiments may comprise an operation of receiving energy information indicative of energy availabilities of said plurality of radio equipment entities. Here, said path optimization request message further includes said energy information.

According to a variation of the procedure shown in FIG. 8, exemplary additional operations are given, which are inherently independent from each other as such. According to such variation, an exemplary method according to example embodiments may comprise an operation of determining, based on said data from said set of radio equipment entities, age information indicative of ages of data from said radio equipment entities. Here, said path optimization request message further includes said age information.

According to a variation of the procedure shown in FIG. 8, exemplary additional operations are given, which are inherently independent from each other as such. According to such variation, an exemplary method according to example embodiments may comprise an operation of imputing data from radio equipment entities of said plurality of radio equipment entities other than said set of radio equipment entities based on said data from said set of radio equipment entities and said temporal and/or spatial correlation among data from said plurality of radio equipment entities.

According to further example embodiments, each of said radio equipment entities is a sensor entity configured to produce sensor data.

According to further example embodiments, said generating comprises applying a neural network to said data from said set of radio equipment entities.

According to further example embodiments, said neural network comprises at least one of the following: a convolutional neural network, a recurrent neural network, a long short-term memory neural network, a multi layer perceptron neural network, a fully connected neural network, a transformer neural network, a graph neural network, or a reinforcement learning based neural network.

Figure 5:
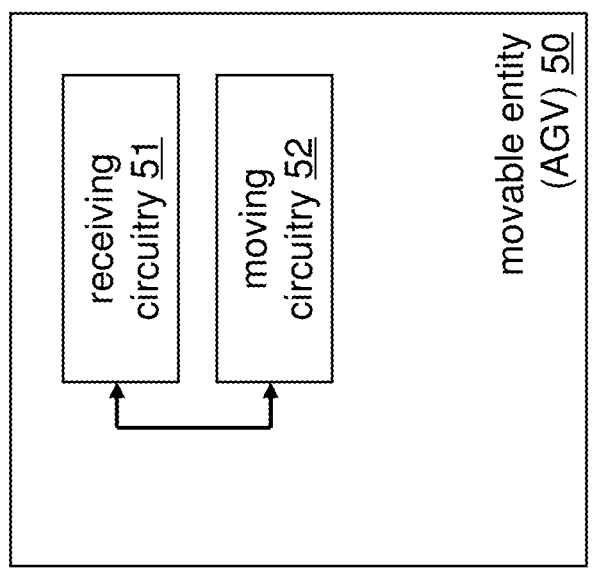
FIG. 5 is a block diagram illustrating an apparatus according to example embodiments.

FIG. 5 is a block diagram illustrating an apparatus according to example embodiments. The apparatus may be a movable or mobile entity 50 such as a drone or autonomous guided vehicle or otherwise movable (self-propelled) vehicle, and comprises a receiving circuitry 51 and a moving circuitry 52. The receiving circuitry 51 receives information on a movement trajectory, said movement trajectory being a path with a minimum length among paths connecting all data read-out zones corresponding to all radio equipment entities of a set of radio equipment entities out of a plurality of radio equipment entities. The moving circuitry 52 moves (controls moving) according to said movement trajectory.

Figure 9:
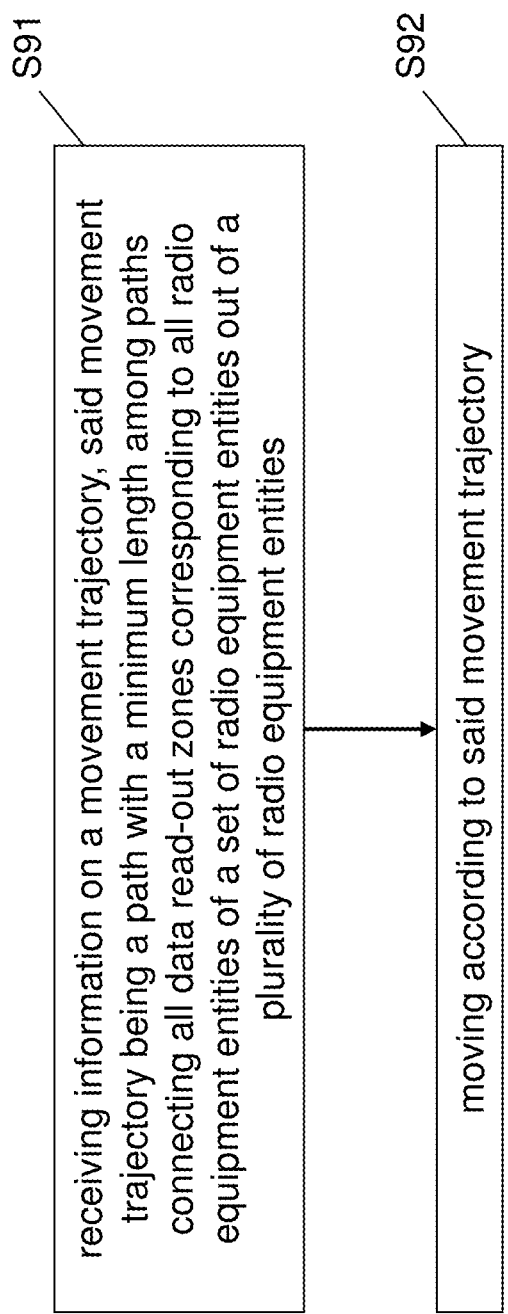
FIG. 9 is a schematic diagram of a procedure according to example embodiments.

FIG. 9 is a schematic diagram of a procedure according to example embodiments. The apparatus according to FIG. 5 may perform the method of FIG. 9 but is not limited to this method. The method of FIG. 9 may be performed by the apparatus of FIG. 5 but is not limited to being performed by this apparatus.

As shown in FIG. 9, a procedure according to example embodiments comprises an operation of receiving (S91) information on a movement trajectory, said movement trajectory being a path with a minimum length among paths connecting all data read-out zones corresponding to all radio equipment entities of a set of radio equipment entities out of a plurality of radio equipment entities, and an operation of moving (S92) according to said movement trajectory.

Figure 6:
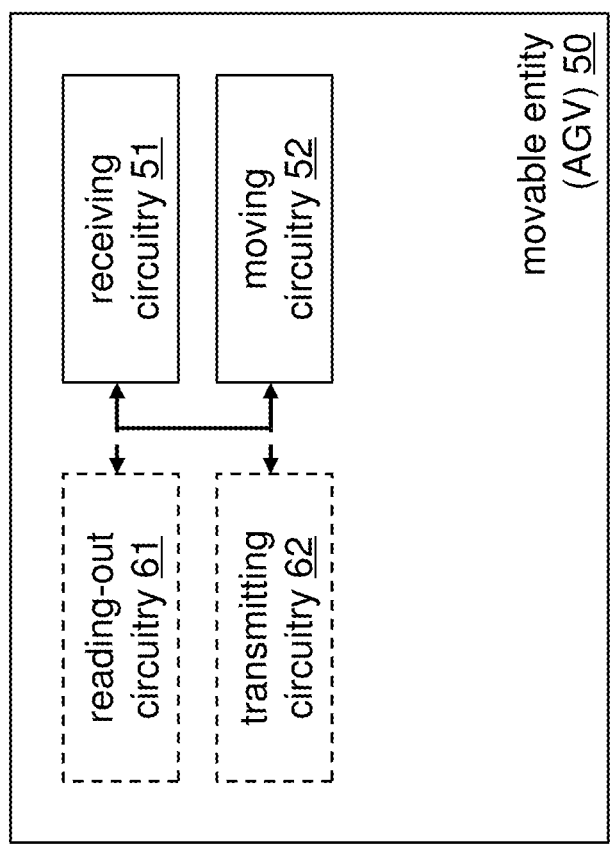
FIG. 6 is a block diagram illustrating an apparatus according to example embodiments.

FIG. 6 is a block diagram illustrating an apparatus according to example embodiments. In particular, FIG. 6 illustrates a variation of the apparatus shown in FIG. 5. The apparatus according to FIG. 6 may thus further comprise a reading-out circuitry 61 and/or a transmitting circuitry 62.

In an embodiment at least some of the functionalities of the apparatus shown in FIG. 5 (or 6) may be shared between two physically separate devices forming one operational entity. Therefore, the apparatus may be seen to depict the operational entity comprising one or more physically separate devices for executing at least some of the described processes.

According to a variation of the procedure shown in FIG. 9, exemplary additional operations are given, which are inherently independent from each other as such. According to such variation, an exemplary method according to example embodiments may comprise an operation of receiving information on said set of radio equipment entities.

According to a variation of the procedure shown in FIG. 9, exemplary additional operations are given, which are inherently independent from each other as such. According to such variation, an exemplary method according to example embodiments may comprise an operation of reading-out data from said set of radio equipment entities along said movement path.

According to a variation of the procedure shown in FIG. 9, exemplary additional operations are given, which are inherently independent from each other as such. According to such variation, an exemplary method according to example embodiments may comprise an operation of transmitting data from said set of radio equipment entities.

According to further example embodiments, each of said radio equipment entities is a sensor entity configured to produce sensor data.

Example embodiments outlined and specified above are explained below in more specific terms.

Figure 10:
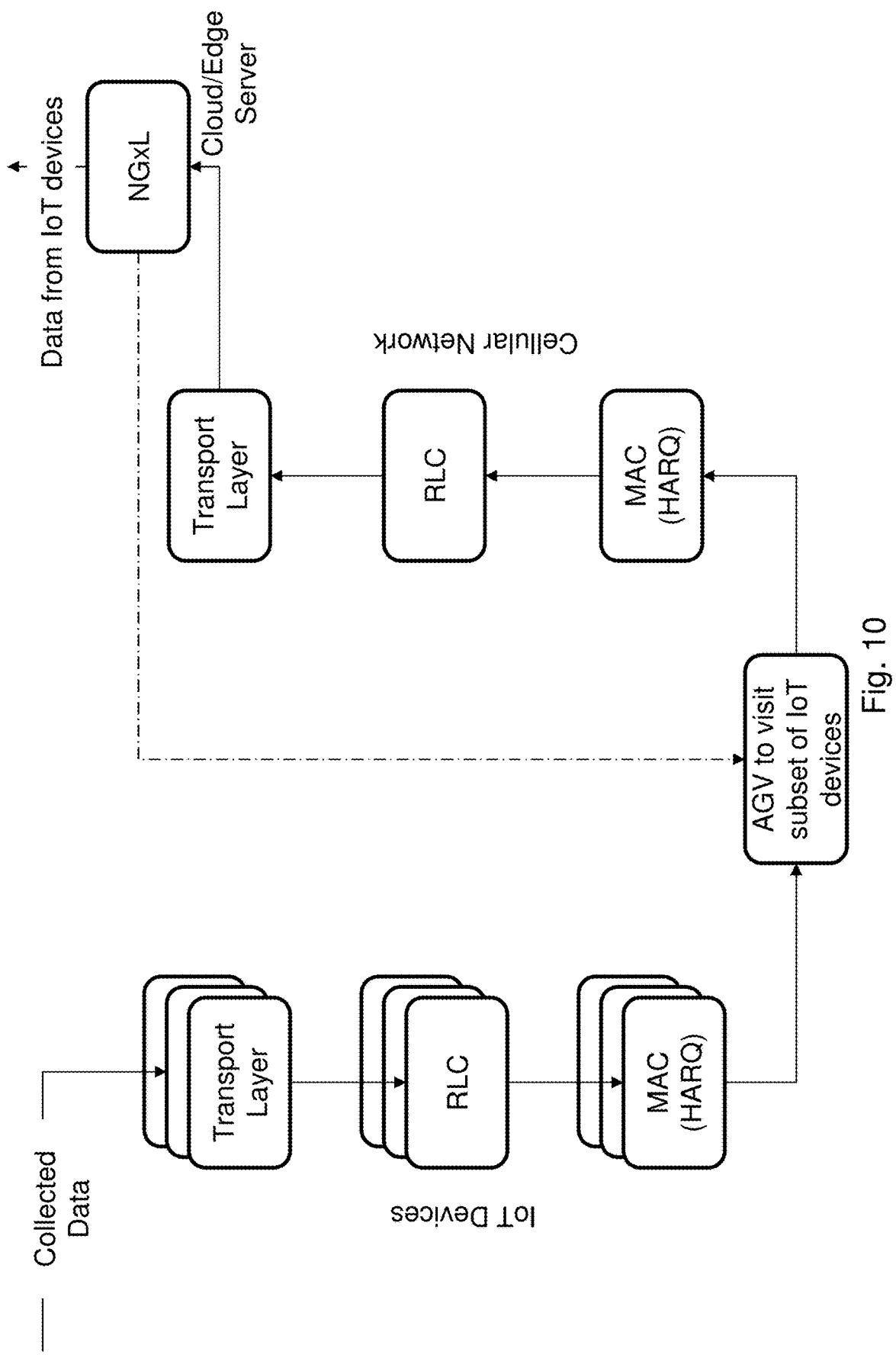
FIG. 10 shows a schematic diagram of an example of a system environment with signaling variants according to example embodiments.

FIG. 10 shows a schematic diagram of an example of a system environment with signaling variants according to example embodiments, and in particular illustrates a protocol stack reused by the NGxL architecture according to example embodiments. This reduces retransmissions at the lower layers by relying on the newly added NGxL intelligence with minimum extra-signaling.

FIG. 10 describes a an involvement of the NGxL architecture according to example embodiments, where data collected from IoT devices is passed through to the transport layer (TL), radio link control (RLC) and hybrid automatic repeat request (HARQ) layers. From there, the NGxL informs the involved AGV via the 5G (or 6G or beyond) network on which sensors to select and the AGV collects data from these sensors which depends on the recoverability of the data.

Figure 11:
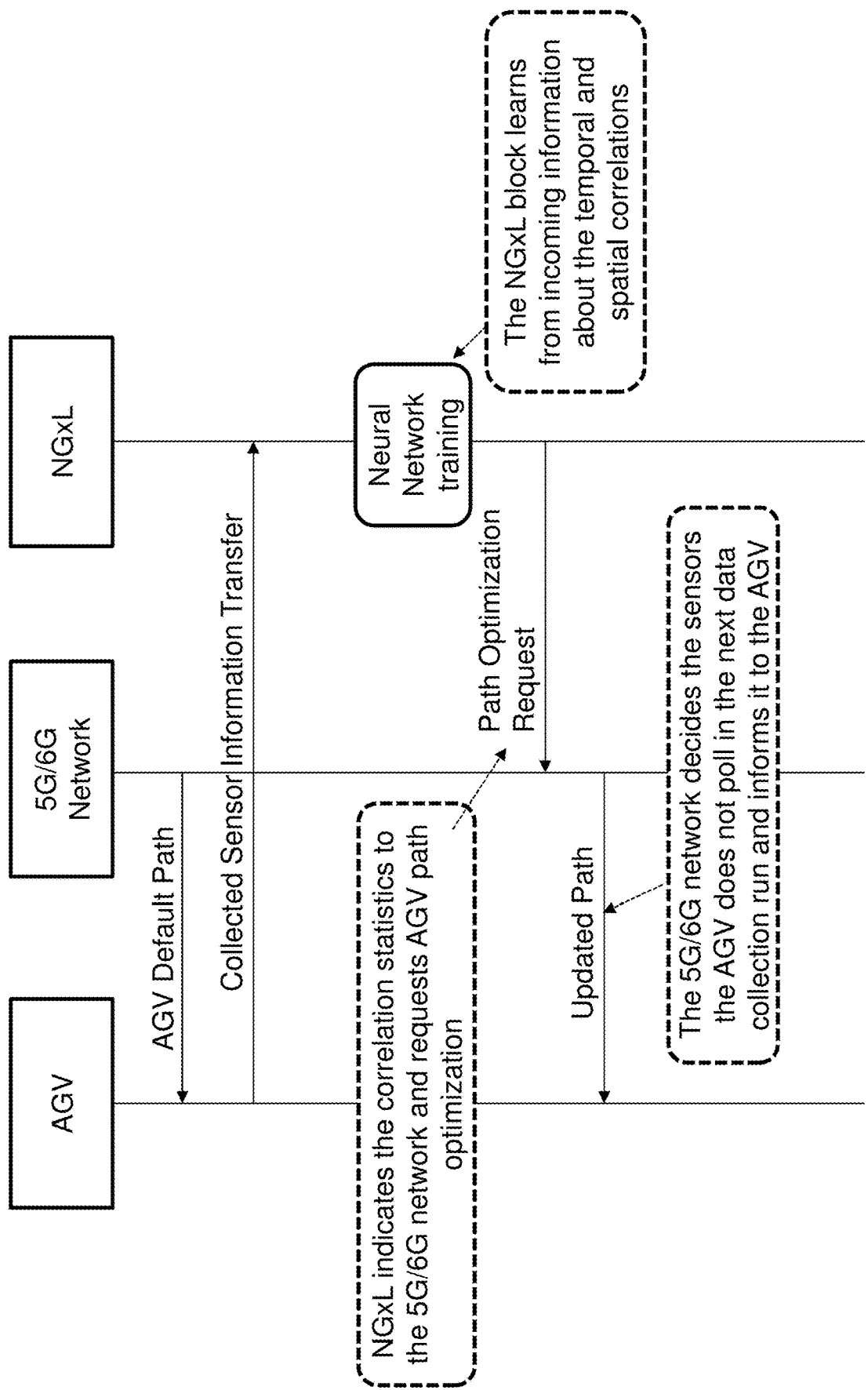
FIG. 11 shows a schematic diagram of signaling sequences according to example embodiments.

FIG. 11 shows a schematic diagram of signaling sequences according to example embodiments, and in particular illustrates a detailed signalling diagram showing interactions between AGV, 5G (6G, etc.) network and NGxL.

The information flow illustrated in FIG. 11 is also reflected by the dashed line from NGxL to AGV.

As illustrated in FIG. 11, data collected by the AGVs is transmitted upstream in the network via the various layers within the protocol stack. Note that only the layers are shown that employ some form of error recovery via correction or retransmissions.

As illustrated in FIG. 11, the data is then passed on to the NGxL block, which is a trained neural network that is placed e.g. in an edge server or a centralized data center that performs data recovery/reconstruction by utilizing the temporal and spatial information that it has learnt during the training process.

According to example embodiments, upon a path optimization request, with which correlation statistics are indicated to the (e.g. 5G, 6G) core network or a corresponding network entity (compound)), sensors that the AGV shall not poll in the next data collection run (or, the other way round, sensors that the AGV shall poll in the next data collection run) are decided and communicated to the AGV (e.g. via an updated path request). Further, a movement trajectory for the AGV to approach the sensors that the AGV shall poll in the next data collection run is determined (and communicated) as well. The AGV then follows the determined movement trajectory in the next data collection run.

Figure 12:
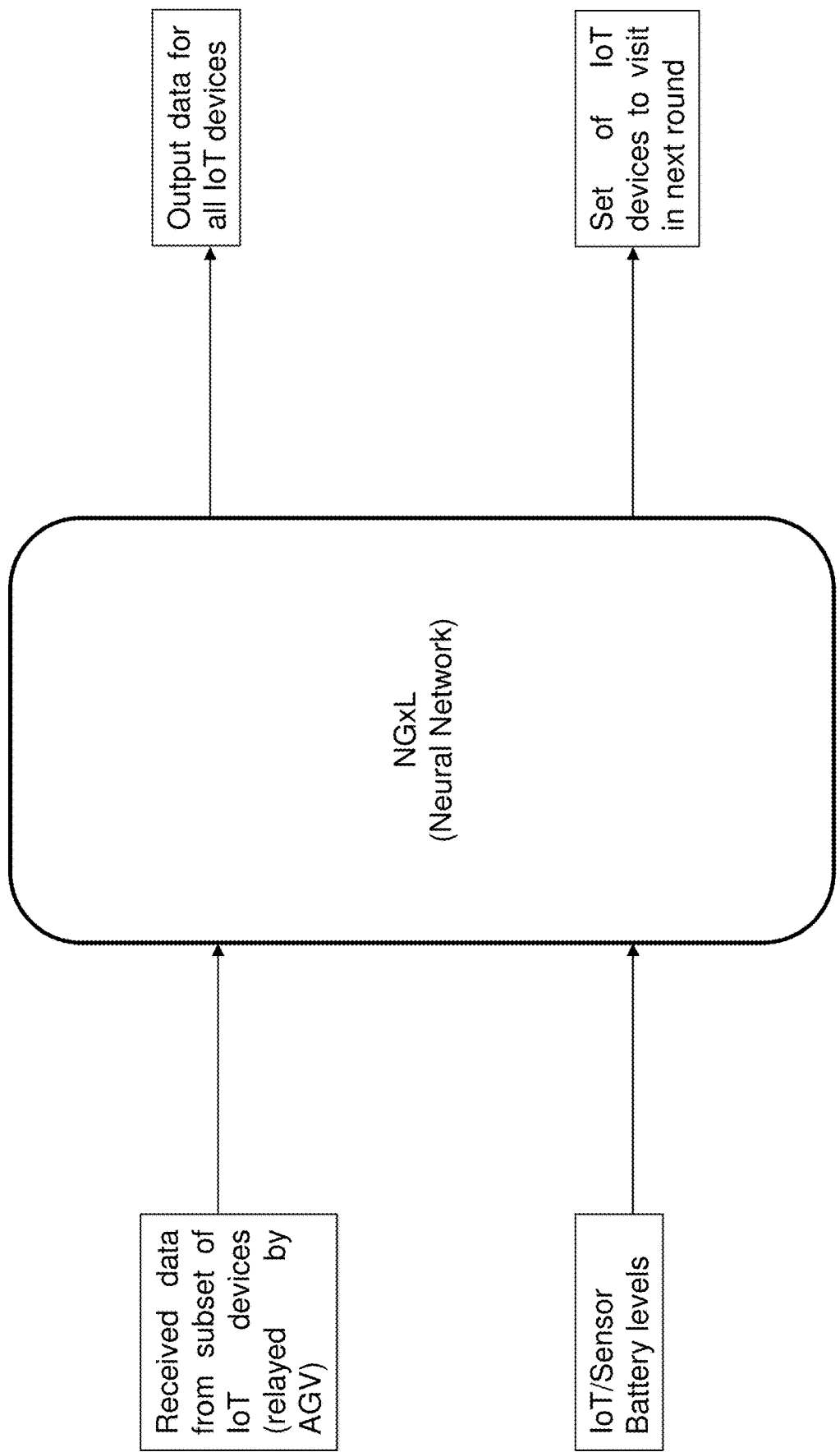
FIG. 12 shows a schematic diagram of neural network according to example embodiments.

FIG. 12 shows a schematic diagram of neural network according to example embodiments, and in particular illustrates NGxL inputs and outputs for the NGxL neural network referred to with respect to FIG. 10.

According to example embodiments, the neural network takes the sensor battery levels and the received data from a subset of IoT devices as the input. This subset is determined by the NGxL (or the 5G/6G network or a combination of both) in the previous round based on the received data at that time. Given this input, according to example embodiments, the NGxL predicts the data for all the sensors by imputing the unknown data with spatial and temporal correlation. In addition, according to example embodiments, the NGxL outputs correlation statistics based on the current received data and the battery levels of the sensors, which are then used by the 5G/6G network functions to determine the set of sensors to be polled in the next round.

Given the set of sensors to poll, the AGV trajectory can be optimized to minimize the distance and energy consumption for the AGV. Since the power consumption for an AGV (for example UAVs in remote/harsh environments) is primarily dependent on the distance travelled or flight time, it becomes important to minimize this objective. If S is the total set of IoT sensors and the subset $\overline{S}_i$ is the subset of IoT sensors in the $i^{th}$ trip, then the optimization problem can be written as $$\min_{X,Y=(x_n,y_n)_{n=1}^N} E(X, Y)$$

subject to $$SE(m, x_n, y_n) \geq SE_{min} \quad \forall\, m \in \overline{S}_i$$

where X and Y are the sets of points on the 2D plane denoting the trajectory taken by the AGV/UAV. Here, $X=\{x_1, \ldots, x_N\}$ and $Y=\{y_1, \ldots, y_N\}$ are the points on the trajectory corresponding to the time instants $\{1, \ldots, N\}$. E (X, Y) is the energy required by the AGV/UAV to travel on the trajectory given by (X, Y). $SE(m, x_n, y_n)$ is the spectral efficiency of the $m^{th}$ IoT sensor belonging to the subset $\overline{S}_i$ at position $x_n$, $y_n$. $SE_{min}$ is the minimum spectral efficiency between the IoT device and the AGV/UAV that has to be satisfied during trajectory optimization.

Such a problem is typically non-deterministic polynomial-time (NP) hard to solve (in terms of a complexity class of problems e.g. in computer science) but may be solved approximately. However, through the usage of NGxL, the aforementioned problem can be relaxed and existing algorithms can be used to design/calculate/determine the most efficient path.

To demonstrate the capabilities of the methodology according to example embodiments, a simulation scenario is provided, wherein data is collected from three sensors, and the data for future time steps is predicted.

The data is time series information.

Figure 13:
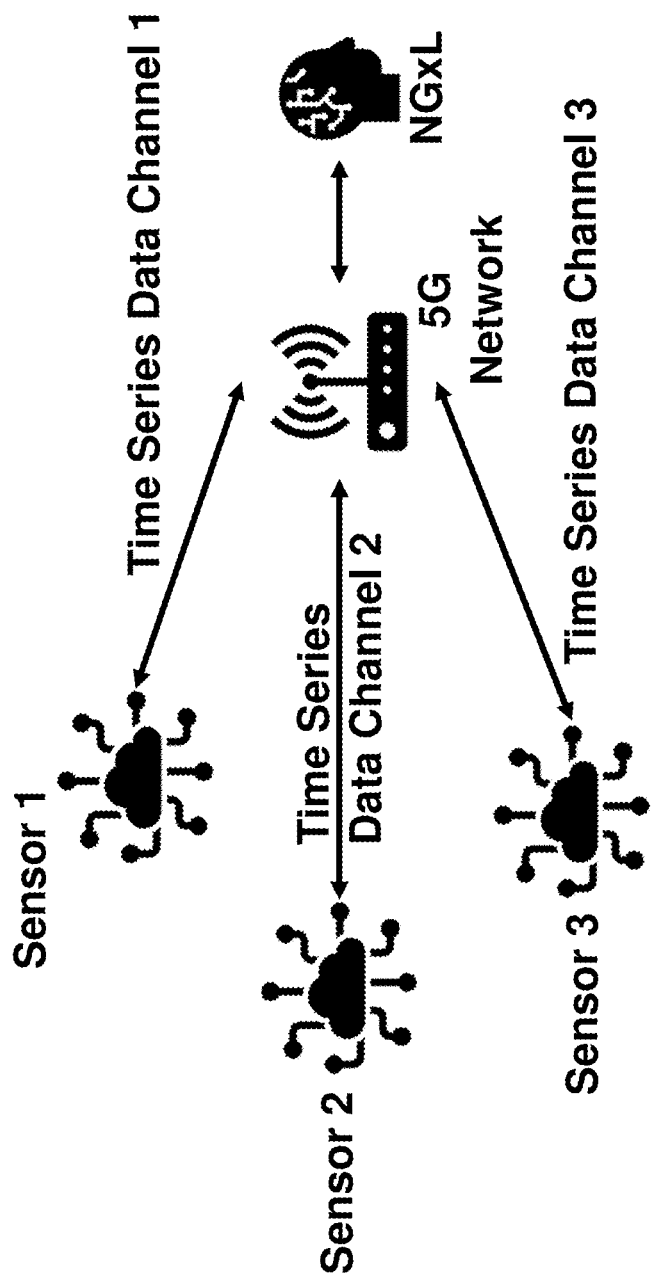
FIG. 13 shows a schematic diagram of an example of a system environment with signaling variants according to example embodiments.

FIG. 13 shows a schematic diagram of an example of a system environment with signaling variants according to example embodiments, and represents the (simulation) scenario under consideration. FIG. 13 can also be considered to reflect a system according to example embodiments of the present invention, where the movable (data collection) entity freely movable between the sensors (here: sensors 1 to 3) is not illustrated.

Figure 14:
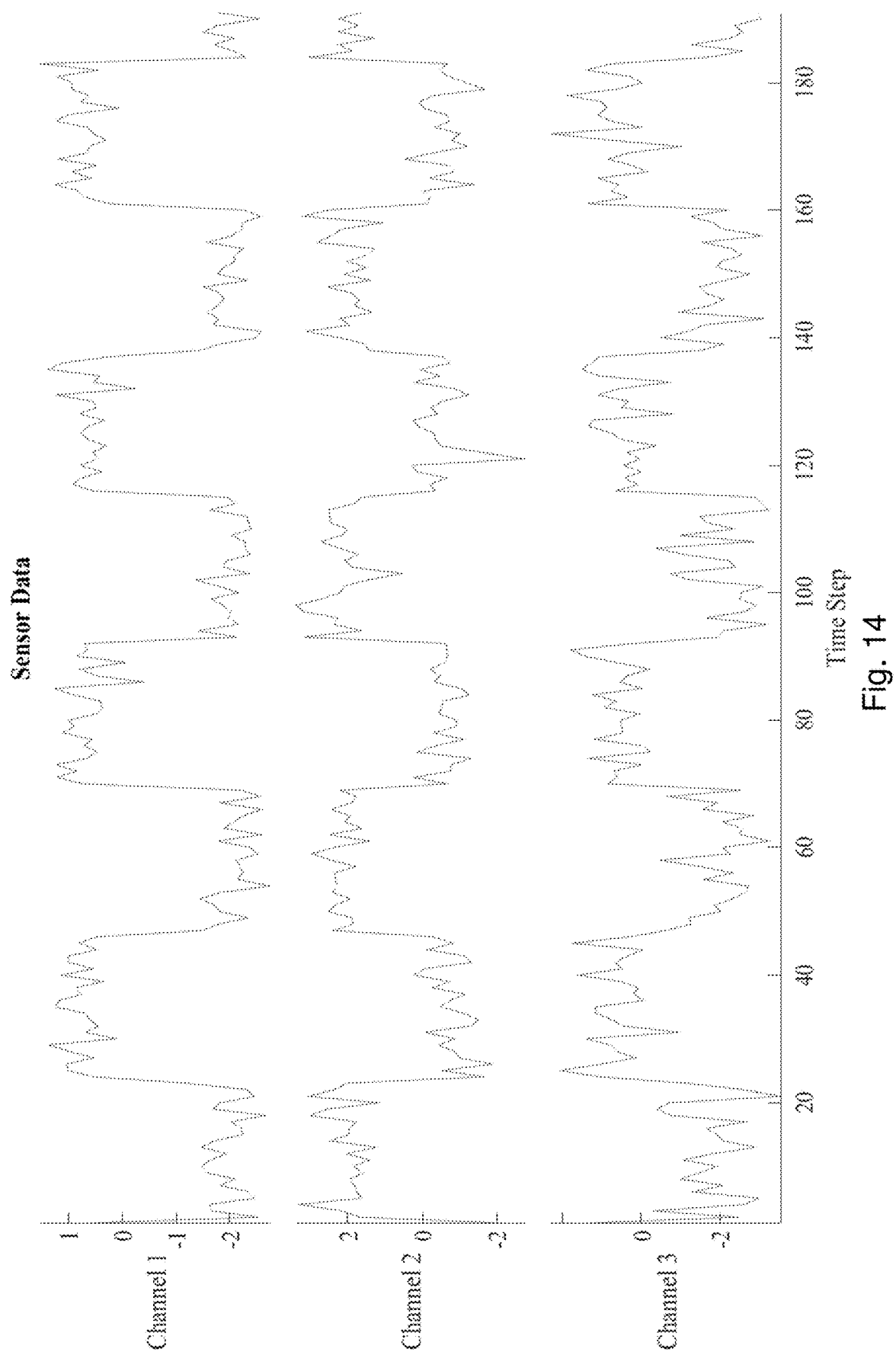
FIG. 14 shows a diagram of sensor data time series according to example embodiments.

FIG. 14 shows a diagram of sensor data time series according to example embodiments, and presents a time series data being generated from/by the three sensors in the scenario being considered. It is noted that the data represented as channel 1 in FIG. 14 corresponds to sensor 1 of FIG. 13, the data represented as channel 2 in FIG. 14 corresponds to sensor 2 of FIG. 13, and the data represented as channel 3 in FIG. 14 corresponds to sensor 3 of FIG. 13.

To predict the data for future time steps, a simple long short term memory (LSTM) neural network is implemented.

Figure 15:
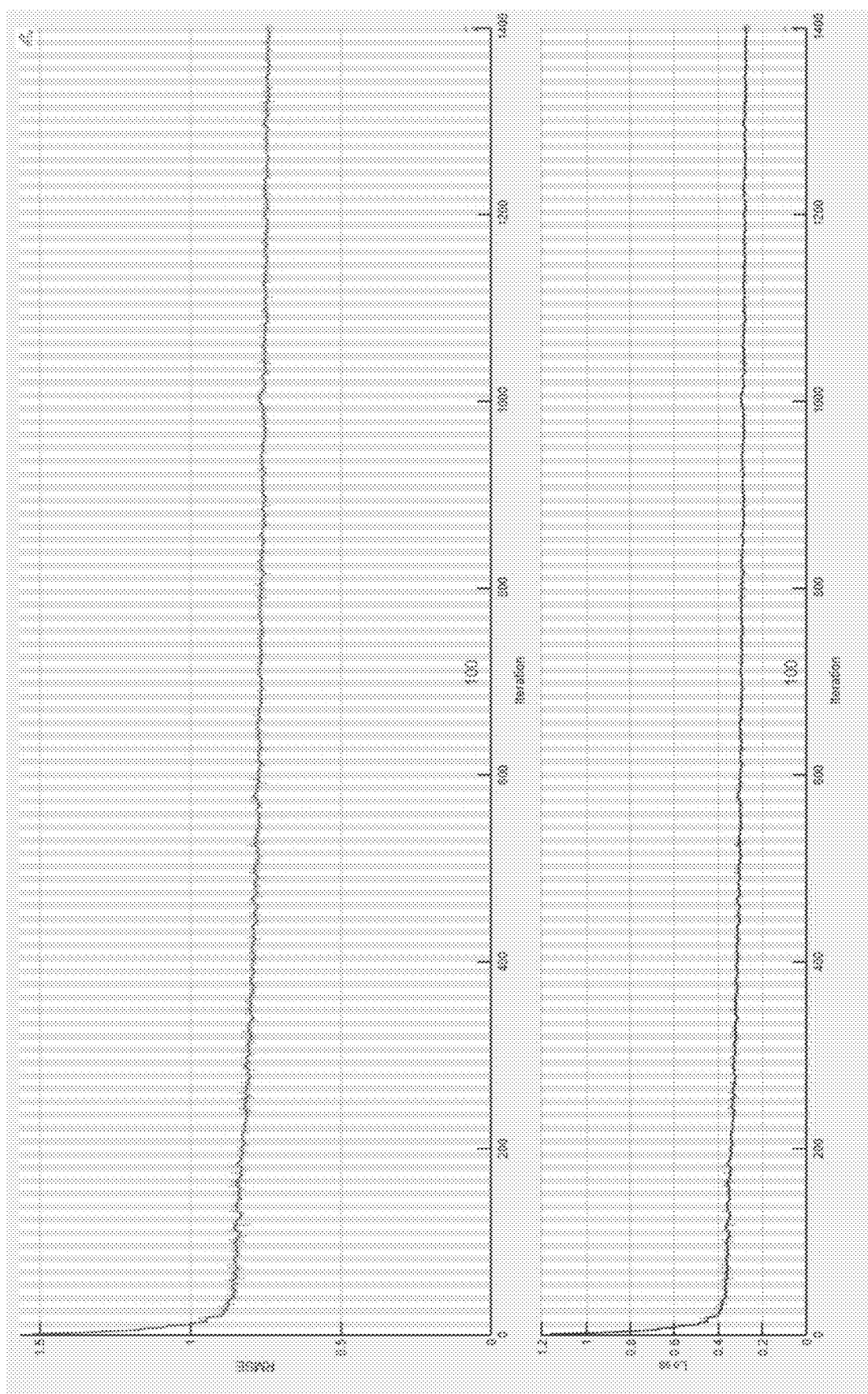
FIG. 15 shows a diagram illustrating neural network training curves according to example embodiments.

FIG. 15 shows a diagram illustrating neural network training curves according to example embodiments, and in particular illustrated the training curves for the training phase of the neural network referred to with respect to FIG. 10.

From the training plots it can be inferred that the LSTM neural network training was completed successfully.

To test the performance of the trained neural network, it was fed with test data on which it had to perform prediction tasks.

Figure 16:
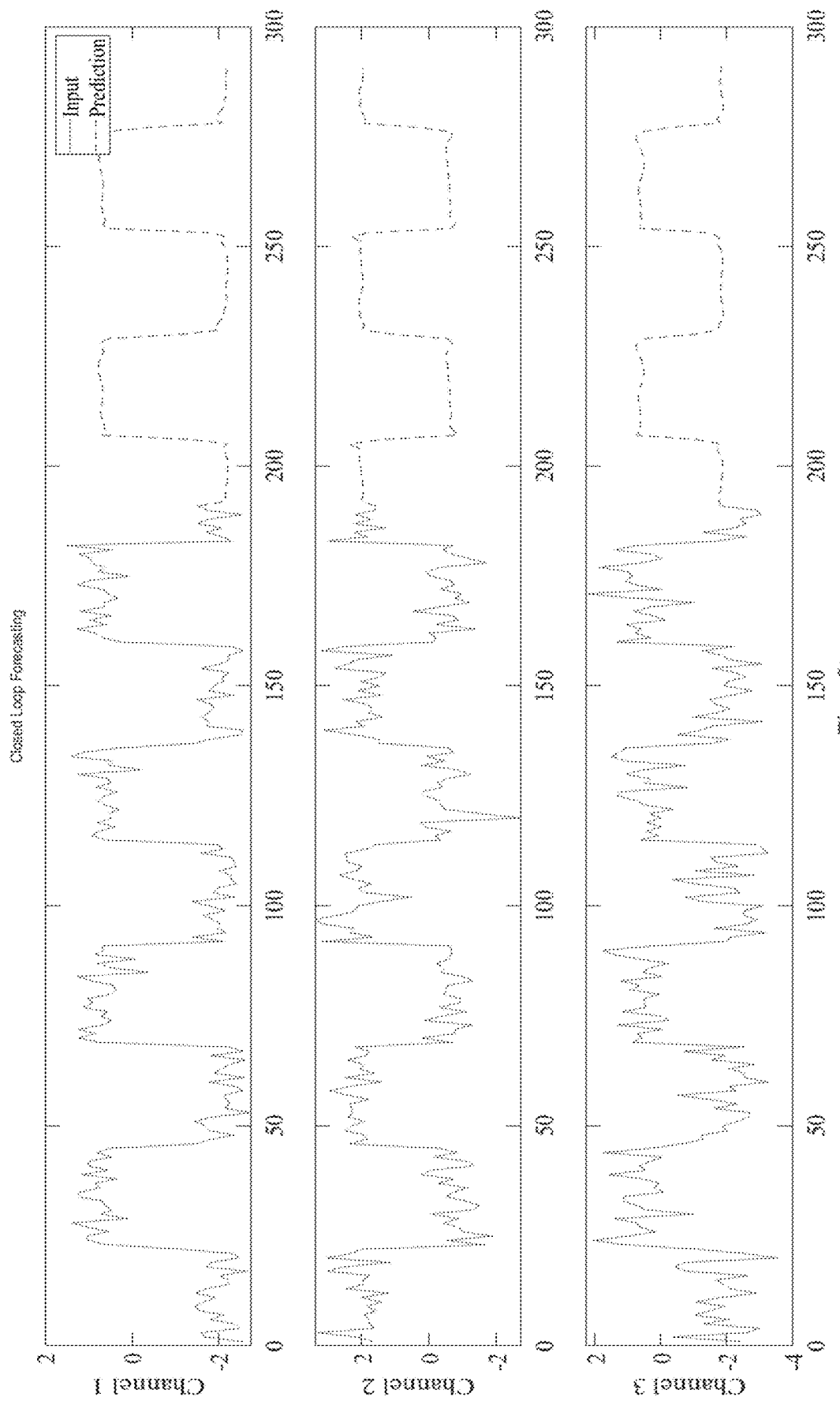
FIG. 16 shows a diagram of sensor data time series including prediction results according to example embodiments.

FIG. 16 shows a diagram of sensor data time series including prediction results according to example embodiments, and in particular illustrates time series prediction (forecasting) results.

FIG. 16 particularly presents a closed loop prediction, wherein the predicted data is taken as input to predict the next step.

The neural network is clearly able to predict the next time steps of the time series data quite accurately given the input data.

Figure 17:
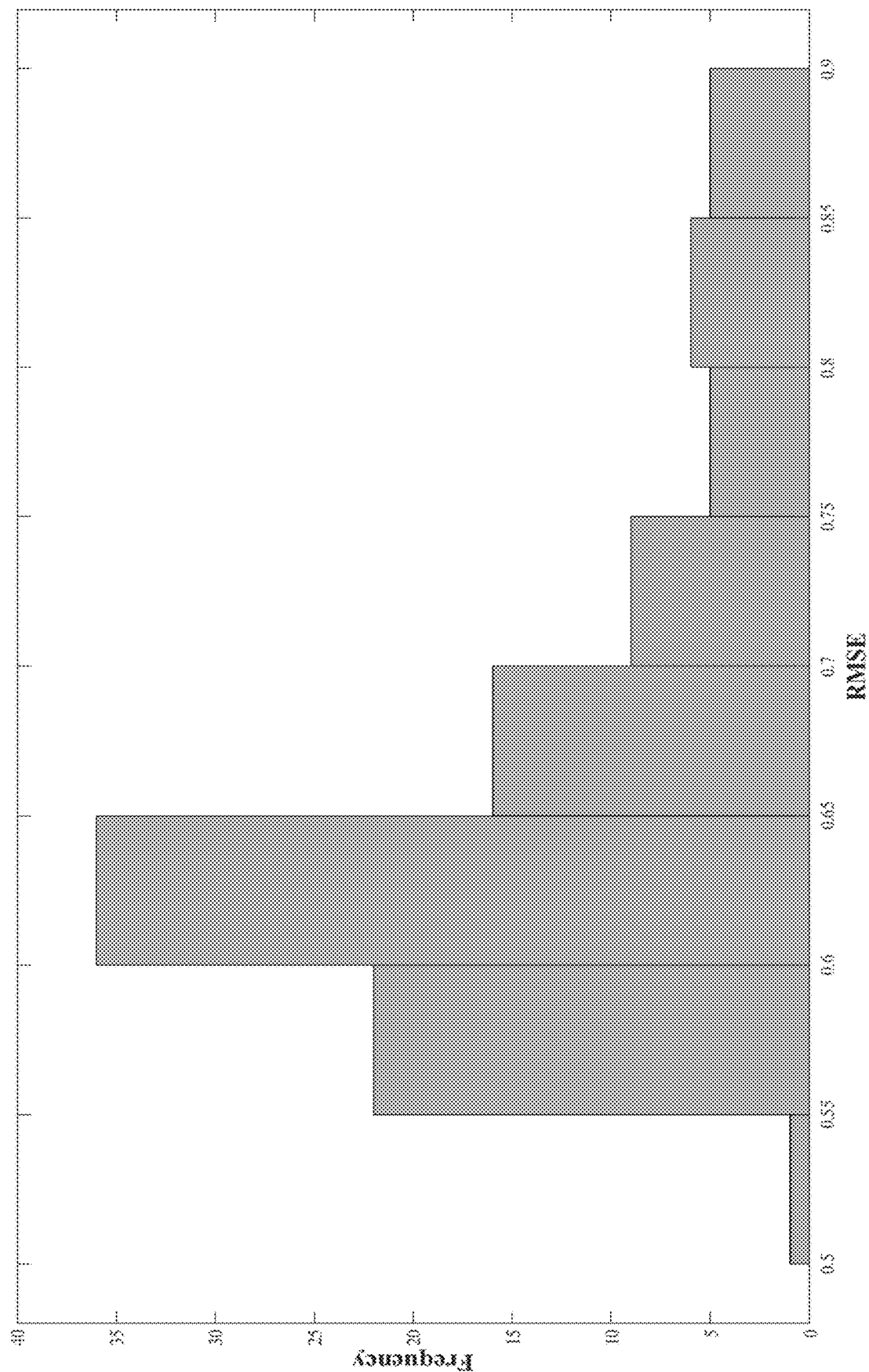
FIG. 17 shows a diagram illustrating neural network performances according to example embodiments.

FIG. 17 shows a diagram illustrating neural network performances according to example embodiments, and in particular illustrates a root mean squared error (RMSE) performance of the (LSTM) neural network referred to with respect to FIG. 10 to predict next time step information given the input data.

The RMSE performance of the LSTM network shows the powerful capability of the neural networks to predict the missing data with a high degree of accuracy.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network node or entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 18:
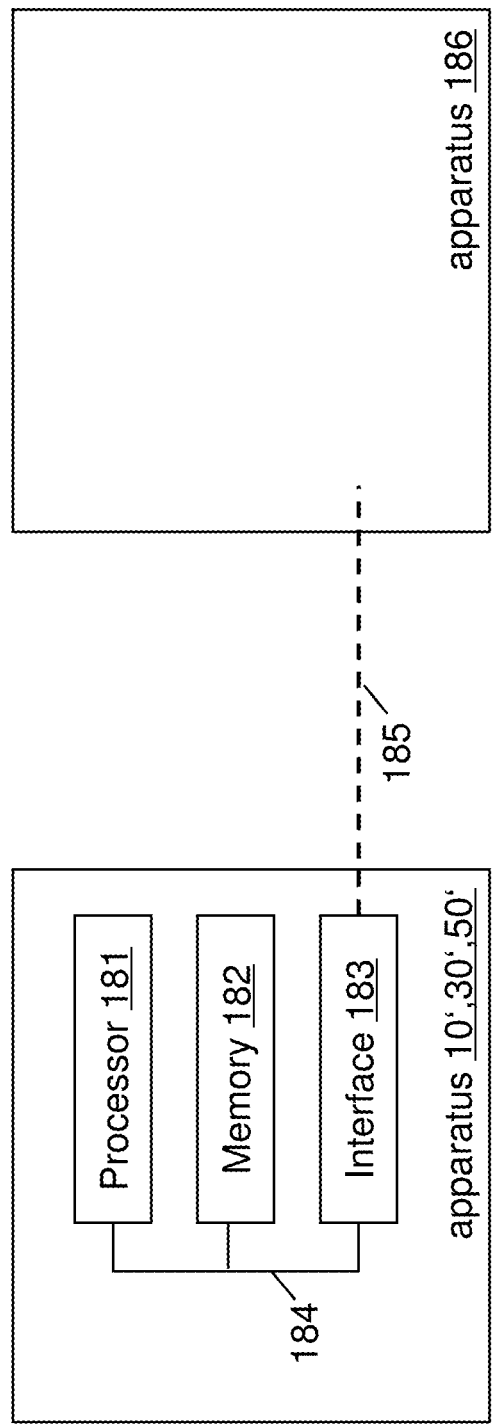
FIG. 18 is a block diagram alternatively illustrating apparatuses according to example embodiments.

In FIG. 18, an alternative illustration of apparatuses according to example embodiments is depicted. As indicated in FIG. 18, according to example embodiments, the apparatus 10' (corresponding to the network node/entity (compound) 10) comprises a processor 181, a memory 182 and an interface 183, which are connected by a bus 184 or the like. Further, according to example embodiments, the apparatus 30' (corresponding to the network node/entity 30) comprises a processor 181, a memory 182 and an interface 183, which are connected by a bus 184 or the like. Further, according to example embodiments, the apparatus 50' (corresponding to the movable entity 50) comprises a processor 181, a memory 182 and an interface 183, which are connected by a bus 184 or the like. The apparatuses may be connected via link 185 with another apparatus, e.g. another apparatus out of apparatuses 10', 30', 50'.

The processor 181 and/or the interface 183 may also include a modem or the like to facilitate communication over a (hardwire or wireless) link, respectively. The interface 183 may include a suitable transceiver coupled to one or more antennas or communication means for (hardwire or wireless) communications with the linked or connected device(s), respectively. The interface 183 is generally configured to communicate with at least one other apparatus, i.e. the interface thereof.

The memory 182 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network node/entity (compound) 10 comprises at least one processor 181, at least one memory 182 including computer program code, and at least one interface 183 configured for communication with at least another apparatus. The processor (i.e. the at least one processor 181, with the at least one memory 182 and the computer program code) is configured to perform selecting, out of a plurality of radio equipment entities, a set of radio equipment entities, based on correlation information reflecting at least temporal and/or spatial correlation among data from said plurality of radio equipment entities (thus the apparatus comprising corresponding means for selecting), and to perform determining a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities (thus the apparatus comprising corresponding means for determining).

According to example embodiments, an apparatus representing the network node/entity 30 comprises at least one processor 181, at least one memory 182 including computer program code, and at least one interface 183 configured for communication with at least another apparatus. The processor (i.e. the at least one processor 181, with the at least one memory 182 and the computer program code) is configured to perform receiving, from a network entity, data from a set of radio equipment entities out of a plurality of radio equipment entities (thus the apparatus comprising corresponding means for receiving), and to perform generating correlation information reflecting at least temporal and/or spatial correlation among data from said plurality of radio equipment entities based on said data from said set of radio equipment entities (thus the apparatus comprising corresponding means for generating).

According to example embodiments, an apparatus representing the movable entity 50 comprises at least one processor 181, at least one memory 182 including computer program code, and at least one interface 183 configured for communication with at least another apparatus. The processor (i.e. the at least one processor 181, with the at least one memory 182 and the computer program code) is configured to perform receiving information on a movement trajectory, said movement trajectory being a path with a minimum length among paths connecting all data read-out zones corresponding to all radio equipment entities of a set of radio equipment entities out of a plurality of radio equipment entities (thus the apparatus comprising corresponding means for receiving), and to perform moving (controlling to move) according to said movement trajectory (thus the apparatus comprising corresponding means for moving (means for controlling to move)).

For further details regarding the operability/functionality of the individual apparatuses, reference is made to the above description in connection with any one of FIGS. 1 to 17, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for data collection optimization. Such measures exemplarily comprise selecting, out of a plurality of radio equipment entities, a set of radio equipment entities, based on correlation information reflecting at least temporal and/or spatial correlation among data from said plurality of radio equipment entities, and determining a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities.

Even though the disclosure is described above with reference to the examples according to the accompanying drawings, it is to be understood that the disclosure is not restricted thereto.

Rather, it is apparent to those skilled in the art that the present disclosure can be modified in many ways without departing from the scope of the inventive idea as disclosed herein.

The following Items are covered by the above disclosure.

Item 1. A method comprising selecting, out of a plurality of radio equipment entities, a set of radio equipment entities, based on correlation information reflecting at least temporal and/or spatial correlation among data from said plurality of radio equipment entities, and determining a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities.

Item 2. The method according to Item 1, wherein
a data read-out zone corresponding to a radio equipment entity is defined by a spectral efficiency between said radio equipment entity and said movable data collection entity being equal to or larger than a minimum spectral efficiency.

Item 3. The method according to Item 1 or 2, further comprising
transmitting information on said movement trajectory to said movable data collection entity.

Item 4. The method according to any of Items 1 to 3, further comprising
transmitting information on said set of radio equipment entities to said movable data collection entity.

Item 5. The method according to any of Items 1 to 4, further comprising
receiving a path optimization request message including at least said correlation information.

Item 6. The method according to Item 5, wherein
said path optimization request message further includes at least one of the following:
energy information indicative of energy availabilities of said plurality of radio equipment entities, or
age information indicative of ages of data from said radio equipment entities.

Item 7. The method according to Item 6, wherein
said selecting is further based on said energy information and/or said age information.

Item 8. The method according to any of Items 1 to 7, wherein
each of said radio equipment entities is a sensor entity configured to produce sensor data.

Item 9. The method according to any of Items 1 to 8, further comprising
receiving, from said movable data collection entity, data from said set of radio equipment entities, and
forwarding said data from said set of radio equipment entities.

Item 10. A method comprising
receiving, from a network entity, data from a set of radio equipment entities out of a plurality of radio equipment entities, and
generating correlation information reflecting at least temporal and/or spatial correlation among data from said plurality of radio equipment entities based on said data from said set of radio equipment entities.

Item 11. The method according to Item 10, further comprising
transmitting a path optimization request message including at least said correlation information.

Item 12. The method according to Item 11, further comprising
receiving energy information indicative of energy availabilities of said plurality of radio equipment entities, wherein
said path optimization request message further includes said energy information.

Item 13. The method according to Item 11 or 12, further comprising
determining, based on said data from said set of radio equipment entities, age information indicative of ages of data from said radio equipment entities, wherein
said path optimization request message further includes said age information.

Item 14. The method according to any of Items 10 to 13, further comprising
imputing data from radio equipment entities of said plurality of radio equipment entities other than said set of radio equipment entities based on said data from said set of radio equipment entities and said temporal and/or spatial correlation among data from said plurality of radio equipment entities.

Item 15. The method according to any of Items 10 to 14, wherein
each of said radio equipment entities is a sensor entity configured to produce sensor data.

Item 16. The method according to any of Items 10 to 15, wherein
said generating comprises applying a neural network to said data from said set of radio equipment entities.

Item 17. The method according to Item 16, wherein said neural network comprises at least one of the following:
a convolutional neural network,
a recurrent neural network,
a long short-term memory neural network,
a multi layer perceptron neural network,
a fully connected neural network,
a transformer neural network,
a graph neural network, or
a reinforcement learning based neural network.

Item 18. A method comprising
receiving information on a movement trajectory, said movement trajectory being a path with a minimum length among paths connecting all data read-out zones corresponding to all radio equipment entities of a set of radio equipment entities out of a plurality of radio equipment entities, and
moving according to said movement trajectory.

Item 19. The method according to Item 18, further comprising
receiving information on said set of radio equipment entities.

Item 20. The method according to Item 18 or 19, further comprising
reading-out data from said set of radio equipment entities along said movement path.

Item 21. The method according to Item 20, further comprising
transmitting data from said set of radio equipment entities.

Item 22. The method according to any of Items 18 to 21, wherein
each of said radio equipment entities is a sensor entity configured to produce sensor data.

Item 23. An apparatus comprising
selecting circuitry configured to select, out of a plurality of radio equipment entities, a set of radio equipment entities, based on correlation information reflecting at least temporal and/or spatial correlation among data from said plurality of radio equipment entities, and
determining circuitry configured to determine a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities.

Item 24. The apparatus according to Item 23, wherein
a data read-out zone corresponding to a radio equipment entity is defined by a spectral efficiency between said radio equipment entity and said movable data collection entity being equal to or larger than a minimum spectral efficiency.

Item 25. The apparatus according to Item 23 or 24, further comprising
transmitting circuitry configured to transmit information on said movement trajectory to said movable data collection entity.

Item 26. The apparatus according to any of Items 23 to 25, further comprising
transmitting circuitry configured to transmit information on said set of radio equipment entities to said movable data collection entity.

Item 27. The apparatus according to any of Items 23 to 26, further comprising
receiving circuitry configured to receive a path optimization request message including at least said correlation information.

Item 28. The apparatus according to Item 27, wherein said path optimization request message further includes at least one of the following:
energy information indicative of energy availabilities of said plurality of radio equipment entities, or
age information indicative of ages of data from said radio equipment entities.

Item 29. The apparatus according to Item 28, wherein said selecting circuitry is further configured to select based on said energy information and/or said age information.

Item 30. The apparatus according to any of Items 23 to 29, wherein
each of said radio equipment entities is a sensor entity configured to produce sensor data.

Item 31. The apparatus according to any of Items 23 to 30, further comprising
receiving circuitry configured to receive, from said movable data collection entity, data from said set of radio equipment entities, and
forwarding circuitry configured to forward said data from said set of radio equipment entities.

Item 32. An apparatus comprising
receiving circuitry configured to receive, from a network entity, data from a set of radio equipment entities out of a plurality of radio equipment entities, and
generating circuitry configured to generate correlation information reflecting at least temporal and/or spatial correlation among data from said plurality of radio equipment entities based on said data from said set of radio equipment entities.

Item 33. The apparatus according to Item 32, further comprising
transmitting circuitry configured to transmit a path optimization request message including at least said correlation information.

Item 34. The apparatus according to Item 33, further comprising
receiving circuitry configured to receive energy information indicative of energy availabilities of said plurality of radio equipment entities, wherein
said path optimization request message further includes said energy information.

Item 35. The apparatus according to Item 33 or 34, further comprising
determining circuitry configured to determine, based on said data from said set of radio equipment entities, age information indicative of ages of data from said radio equipment entities, wherein said path optimization request message further includes said age information.

Item 36. The apparatus according to any of Items 32 to 35, further comprising
imputing circuitry configured to impute data from radio equipment entities of said plurality of radio equipment entities other than said set of radio equipment entities based on said data from said set of radio equipment entities and said temporal and/or spatial correlation among data from said plurality of radio equipment entities.

Item 37. The apparatus according to any of Items 32 to 36, wherein
each of said radio equipment entities is a sensor entity configured to produce sensor data.

Item 38. The apparatus according to any of Items 32 to 37, wherein
said generating circuitry is configured to apply a neural network to said data from said set of radio equipment entities.

Item 39. The apparatus according to Item 38, wherein said neural network comprises at least one of the following:
a convolutional neural network,
a recurrent neural network,
a long short-term memory neural network,
a multi layer perceptron neural network,
a fully connected neural network,
a transformer neural network,
a graph neural network, or
a reinforcement learning based neural network.

Item 40. An apparatus comprising
receiving circuitry configured to receive information on a movement trajectory, said movement trajectory being a path with a minimum length among paths connecting all data read-out zones corresponding to all radio equipment entities of a set of radio equipment entities out of a plurality of radio equipment entities, and
moving circuitry configured to move according to said movement trajectory.

Item 41. The apparatus according to Item 40, further comprising
receiving circuitry configured to receive information on said set of radio equipment entities.

Item 42. The apparatus according to Item 40 or 41, further comprising
reading-out circuitry configured to read out data from said set of radio equipment entities along said movement path.

Item 43. The apparatus according to Item 42, further comprising
transmitting circuitry configured to transmit data from said set of radio equipment entities.

Item 44. The apparatus according to any of Items 40 to 43, wherein
each of said radio equipment entities is a sensor entity configured to produce sensor data.

Item 45. An apparatus comprising
at least one processor, and
at least one memory storing instructions that, when executed by the at least one processor, cause the apparatus at least to perform:
selecting, out of a plurality of radio equipment entities, a set of radio equipment entities, based on correlation information reflecting at least temporal and/or spatial correlation among data from said plurality of radio equipment entities, and determining a movement trajectory for a movable data collection entity configured for reading-out data from said plurality of radio equipment entities, said movement trajectory being a path with a minimum length among paths connecting all data read-out zones corresponding to all radio equipment entities of said set of radio equipment entities.

Item 46. The apparatus according to Item 45, wherein a data read-out zone corresponding to a radio equipment entity is defined by a spectral efficiency between said radio equipment entity and said movable data collection entity being equal to or larger than a minimum spectral efficiency.

Item 47. The apparatus according to Item 45 or 46, wherein
the instructions, when executed by the at least one processor, cause the apparatus at least to perform:
transmitting information on said movement trajectory to said movable data collection entity.

Item 48. The apparatus according to any of Items 45 to 47, wherein
the instructions, when executed by the at least one processor, cause the apparatus at least to perform:
transmitting information on said set of radio equipment entities to said movable data collection entity.

Item 49. The apparatus according to any of Items 45 to 48, wherein
the instructions, when executed by the at least one processor, cause the apparatus at least to perform:
receiving a path optimization request message including at least said correlation information.

Item 50. The apparatus according to Item 49, wherein said path optimization request message further includes at least one of the following:
energy information indicative of energy availabilities of said plurality of radio equipment entities, or
age information indicative of ages of data from said radio equipment entities.

Item 51. The apparatus according to Item 50, wherein said selecting is further based on said energy information and/or said age information.

Item 52. The apparatus according to any of Items 45 to 51, wherein
each of said radio equipment entities is a sensor entity configured to produce sensor data.

Item 53. The apparatus according to any of Items 45 to 52, wherein
the instructions, when executed by the at least one processor, cause the apparatus at least to perform:
receiving, from said movable data collection entity, data from said set of radio equipment entities, and
forwarding said data from said set of radio equipment entities.

Item 54. An apparatus comprising
at least one processor, and
at least one memory storing instructions that, when executed by the at least one processor, cause the apparatus at least to perform:
receiving, from a network entity, data from a set of radio equipment entities out of a plurality of radio equipment entities, and
generating correlation information reflecting at least temporal and/or spatial correlation among data from said plurality of radio equipment entities based on said data from said set of radio equipment entities.

Item 55. The apparatus according to Item 54, wherein the instructions, when executed by the at least one processor, cause the apparatus at least to perform:
transmitting a path optimization request message including at least said correlation information.

Item 56. The apparatus according to Item 55, wherein
the instructions, when executed by the at least one processor, cause the apparatus at least to perform:
receiving energy information indicative of energy availabilities of said plurality of radio equipment entities, wherein
said path optimization request message further includes said energy information.

Item 57. The apparatus according to Item 55 or 56, wherein
the instructions, when executed by the at least one processor, cause the apparatus at least to perform:
determining, based on said data from said set of radio equipment entities, age information indicative of ages of data from said radio equipment entities, wherein
said path optimization request message further includes said age information.

Item 58. The apparatus according to any of Items 54 to 57, wherein
the instructions, when executed by the at least one processor, cause the apparatus at least to perform:
imputing data from radio equipment entities of said plurality of radio equipment entities other than said set of radio equipment entities based on said data from said set of radio equipment entities and said temporal and/or spatial correlation among data from said plurality of radio equipment entities.

Item 59. The apparatus according to any of Items 54 to 58, wherein
each of said radio equipment entities is a sensor entity configured to produce sensor data.

Item 60. The apparatus according to any of Items 54 to 59, wherein
said generating comprises applying a neural network to said data from said set of radio equipment entities.

Item 61. The apparatus according to Item 60, wherein said neural network comprises at least one of the following:
a convolutional neural network,
a recurrent neural network,
a long short-term memory neural network,
a multi layer perceptron neural network,
a fully connected neural network,
a transformer neural network,
a graph neural network, or
a reinforcement learning based neural network.

Item 62. An apparatus comprising
at least one processor, and
at least one memory storing instructions that, when executed by the at least one processor, cause the apparatus at least to perform:
receiving information on a movement trajectory, said movement trajectory being a path with a minimum length among paths connecting all data read-out zones corresponding to all radio equipment entities of a set of radio equipment entities out of a plurality of radio equipment entities, and
moving according to said movement trajectory.

Item 63. The apparatus according to Item 62, wherein
the instructions, when executed by the at least one processor, cause the apparatus at least to perform:
receiving information on said set of radio equipment entities.

Item 64. The apparatus according to Item 62 or 63, wherein
the instructions, when executed by the at least one processor, cause the apparatus at least to perform:
reading-out data from said set of radio equipment entities along said movement path.

Item 65. The apparatus according to Item 64, wherein the instructions, when executed by the at least one processor, cause the apparatus at least to perform:
transmitting data from said set of radio equipment entities.

Item 66. The apparatus according to any of Items 62 to 64, wherein
each of said radio equipment entities is a sensor entity configured to produce sensor data.

Item 67. A system, comprising
a first network entity according to any of Items 1 to 9,
a second network entity according to any of Items 10 to 17, and
a movable data collection entity according to any of Items 18 to 22.

Item 68. The system according to Item 67, further comprising
said plurality of radio equipment entities.

Item 69. A computer program product comprising computer-executable computer program code which, when the program is run on a computer, is configured to cause the computer to carry out the method according to any one of Items 1 to 9, 10 to 17, or 18 to 22.

Item 70. The computer program product according to Item 69, wherein the computer program product comprises a computer-readable medium on which the computer-executable computer program code is stored, and/or wherein the program is directly loadable into an internal memory of the computer or a processor thereof.

List of Acronyms and Abbreviations

3GPP 3rd Generation Partnership Project
5G 5th Generation
AGV autonomous guided vehicle
AoI Age of Information
BLER block error rate
HARQ hybrid automatic repeat request
IIoT Industrial Internet of Things
IoT Internet of Things
LSTM long short term memory
LTE Long Term Evolution
mMTC massive machine-type communications
NB-IoT narrow-band IoT
NGxL next generation cross layer
NP non-deterministic polynomial-time
NR New Radio
PA power amplifier
Redcap reduced capability
RF radio frequency
RLC radio link control
RMSE root mean squared error
TL transport layer
UAV unmanned aerial vehicle
UE user equipment

The invention claimed is:

1. A method comprising
selecting, out of a plurality of radio equipment entities, a current subset of radio equipment entities to be polled by the apparatus, based on a prediction of data of the plurality of radio equipment entities, wherein the prediction of data is based on correlation information reflecting at least temporal and spatial correlation among data from said plurality of radio equipment entities, the correlation information being generated based on data received from a previous subset of radio equipment entities selected from the plurality of radio equipment entities prior to the current subset of radio equipment entities, and
determining a movement trajectory for a movable data collection entity configured for reading-out data from said plurality of radio equipment entities, said movement trajectory being a path with a minimum length among paths connecting all data read-out zones corresponding to all radio equipment entities of said current subset of radio equipment entities.

2. The method according to claim 1, wherein
a data read-out zone corresponding to a radio equipment entity is defined by a spectral efficiency between said radio equipment entity and said movable data collection entity being equal to or larger than a minimum spectral efficiency.

3. The method according to claim 1, further comprising transmitting information on said movement trajectory to said movable data collection entity.

4. The method according to claim 1, further comprising transmitting information on said current subset of radio equipment entities to said movable data collection entity.

5. The method according to claim 1, further comprising receiving a path optimization request message including at least said correlation information.

6. The method according to claim 5, wherein said path optimization request message further includes at least one of the following:
energy information indicative of energy availabilities of said plurality of radio equipment entities, or
age information indicative of ages of data from said radio equipment entities.

7. The method according to claim 6, wherein said selecting is further based on said energy information and/or said age information.

8. The method according to claim 1, wherein each of said radio equipment entities is a sensor entity configured to produce sensor data.

9. The method according to claim 1, further comprising receiving, from said movable data collection entity, data from said current subset of radio equipment entities, and forwarding said data from said current subset of radio equipment entities.

* * * * *